Oct. 25, 1966     W. A. MELANSON     3,281,744

VARIABLE CORE LOCKED IMPEDANCE DEVICES

Filed April 22, 1964     2 Sheets-Sheet 1

INVENTOR.
William A. MELANSON
BY
Roberts, Cushman & Grover,
ATTORNEYS.

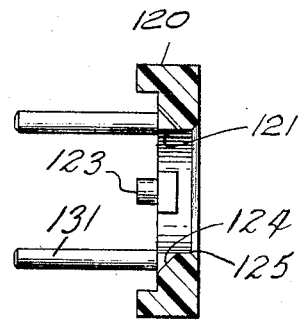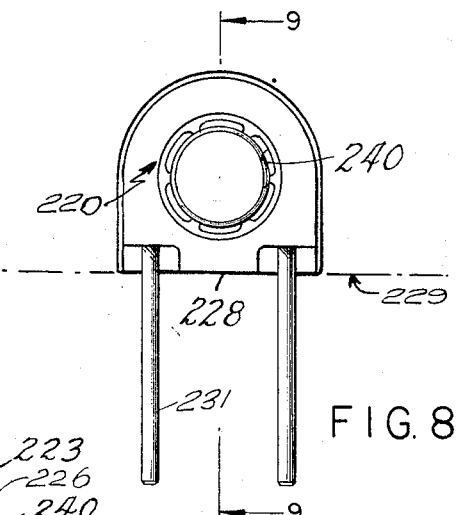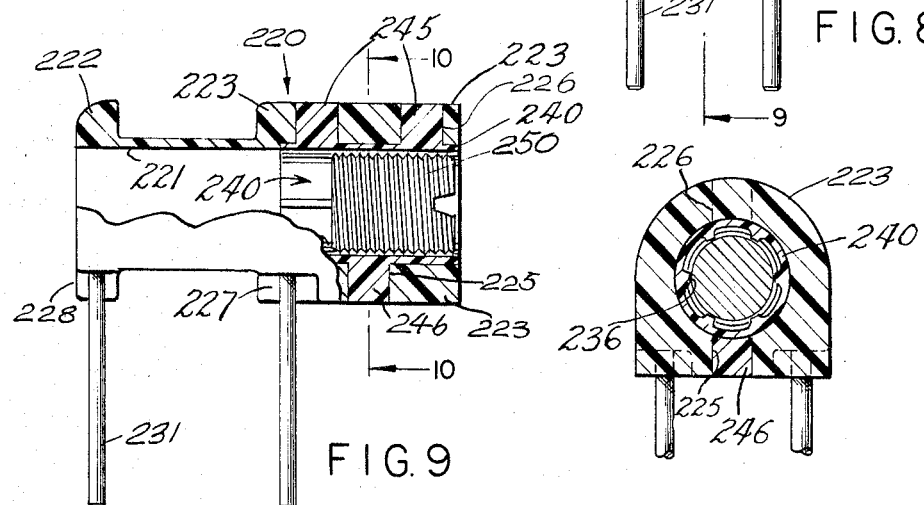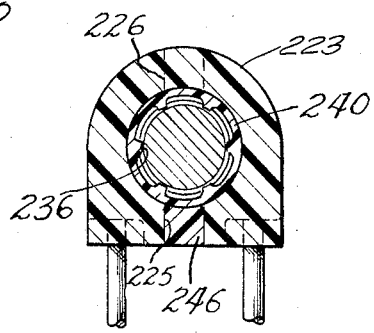

3,281,744
VARIABLE CORE LOCKED IMPEDANCE DEVICES
William A. Melanson, Lexington, Mass., assignor to Cambridge Thermionic Corporation, Cambridge, Mass., a corporation of Massachusetts
Filed Apr. 22, 1964, Ser. No. 361,679
11 Claims. (Cl. 336—65)

The field of this invention is that of variable impedance devices including reactors and capacitors of the type which have an inner impedance control component, such as a core, relatively movable within an outer component, such as a coil or sleeve.

It is customary to adjust impedance devices of this type by means of interengaging threads of the relatively adjustable components. Particular care must be taken to preserve a non-varying gap between the components and to prevent relative movement thereof after fairly easy adjustment. Various provisions for that purpose have been proposed, including externally compressible threaded sleeves for applying a frictional torque to the thread of a core stud. Such auxiliary mechanical expedients however are not fully satisfactory for all purposes, especially if the impedance devices involved are of extremely small size and extreme mechanical, thermal, and electrical stresses and transients must be anticipated.

Objects of the present invention are to provide variable impedance devices especially adapted to maintain a predetermined relative position between two relatively movable components when exposed to vibration and temperature change; to provide such devices which are of extreme simplicity in the manufacture of their components and their assembly and which nevertheless provide for fully reliable and stable interlocking of the relatively movable components after convenient and exact adjustment; to provide such devices wherein the two relatively movable components can be easily separated and reassembled without impairment of quality of their expected functions; to provide such devices which are especially suitable for printed circuitry utilizing solder terminal pins with precision aligned centers, withstanding the heat of dip-soldering without loosening of pins; and generally to provide such devices which are of superior endurance and performance quality and accomplish their functions with simple, inexpensive and yet fully reliable expedients.

The substance of the invention for obtaining the above objects may be summarized as follows.

Mounts for adjustable impedance devices comprise, according to the invention, as principal components an apertured supporting base component of highly heat resistive and dimensionally stable synthetic material and an insert or sleeve or resilient tear resisting and likewise stable synthetic material. The base component can be plate shaped with a window therein, or it may be longitudinal with a recess or bore and one or more flanges. Metallic mounting means such as pins are preferably molded into the supporting base, either parallel or transverse to the direction of adjustment. The insert or sleeve is of generally tubular shape and has projections or faces molded into corresponding locking shapes of the supporting base such as to firmly secure the two components against linear and rotatory separation. The insert or sleeve is further provided with a plurality of interior lands symmetrical to the axis. The adjustable impedance component proper which completes the impedance device is a metallic core, magnetic or non-magnetic, of conventional design with outside threads whose diameter is somewhat larger than the diametrical distance of the lands of the insert, so that the core thread is capable of forming its own female thread upon being introduced into and rotated within the insert or sleeve. Due to this composite construction of the mount, the base and insert components respectively, can be made of materials which are optimally suited for their respective purposes and functions.

In the method aspect of fabricating impedance mounts according to the invention, the technique for assembling such mounts comprises an initial step of forming the supporting base from a highly heat resistive and dimensionally stable thermosetting resin with an opening or bore, and locking configurations such as indentations, recesses, bevels or cutaway portions, and with pin means molded thereinto. The finishing step involves molding the insert or sleeve into the opening or bore of the base with configurations engaging the corresponding locking portions of the support. The insert is formed with the above-mentioned interior lands which are adapted to receive the penetrating threads of the adjustable core. The sleeve or insert member is molded from a dimensionally stable thermoplastic resin which has high resilience and tear strength, and immunity to stress-cracking.

In an important aspect, the invention contemplates a mount for an adjustable core, of superior quality and simplicity due to resolving the complete mount into two and only two components in such a manner that each component can be made of a material that is best suited for a particular function, namely a very stable base capable of resisting high temperature, and an insert which is highly resilient and tear resisting; both components are also dimensionally stable and have excellent electrical properties. This resolution further permits a favorable fabricating technique by molding a rather complex thermoplastic shape into a previously formed heat resistant thermosetting shape.

These and other objects and aspects of novelty of the invention will appear from the following description of several typical embodiments therof illustrating its novel characteristics.

The description refers to accompanying drawings wherein

FIG. 7 is an axial section of the supporting base shown in FIGS. 4 and 5 prior to assembly thereof with the sleeve insert;

FIG. 8 is an end view of a third embodiment of the invention, another horizontal coil form;

FIG. 9 is a side view partly in section on line 9—9 of FIG. 8;

FIG. 10 is a section on line 10—10 of FIG. 9; and

FIG. 11 is a flow diagram illustrating the fabricating method according to the invention.

Figure 1:
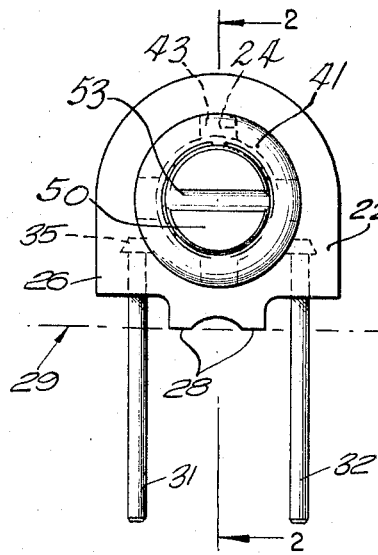
FIG. 1 is an end view of a horizontal coil form according to the invention.
Figure 2:
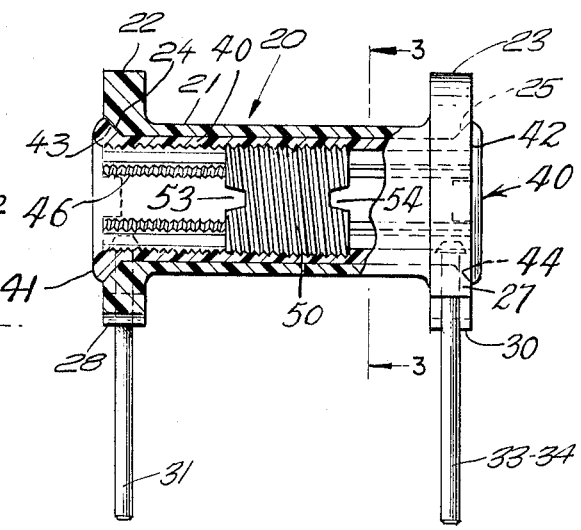
FIG. 2 is a side view, partly in axial section on lines 2—2 of FIG. 1.
Figure 3:
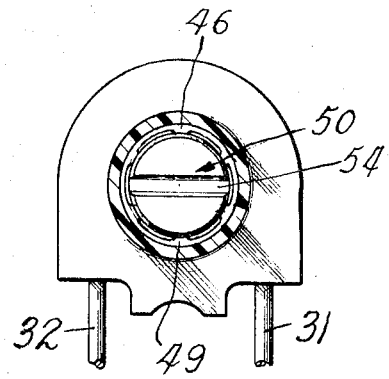
FIG. 3 is a section on lines 3—3 of FIG. 2.

Referring to FIGS. 1, 2 and 3, the embodiment illustrated in these figures is a so-called horizontal coil form intended for mounting parallel to a surface such as of a printed wiring board. The base component is in this embodiment a support 20 having a tubular portion 21 and two flanges 22 and 23. Each flange has a number of chamfered cutouts or indentations, in this instance four on each side, indicated at 24 at the inner edge of flange 22 and at 25 at the inner edge of the other flange 23. Four pins 31, 32, 33, 34 are insertion molded into projections 26, 27 of flanges 22, 23. In order better to secure the pins in the flange of base 20, they are preferably provided with anchoring heads 35. In addition to the heads, the edges of the heads or separate embedded portions of the pins may be knurled as an antirotation measure. In order to distance the coil form from the surface 29 of the supporting board, the projections 26, 27 have antimoisture platforms with feet 28, 30 which contact the mounting board.

Figure 4:
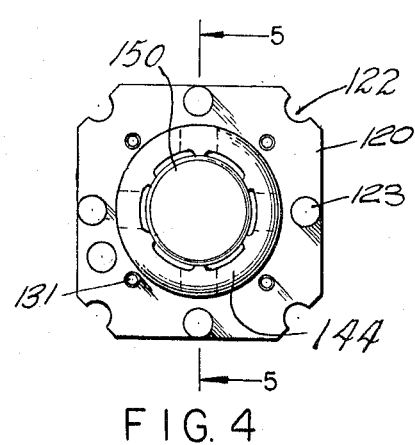
FIG. 4 is the bottom view of a second embodiment of the invention, a vertical coil form.
Figure 6:
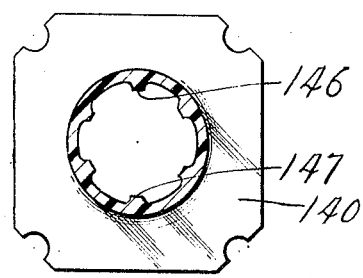
FIG. 6 is a section on line 6—6 of FIG. 5.

The insert or sleeve member 40 is of tubular shape, with lips 41, 42 at each end, respectively, and with four spline bulges at each end, indicated at 43, 44, which anchor the sleeve member in the above-mentioned chamfered recesses or cutaway portions 24, 25 of the base member, being molded thereinto as will be described hereinbelow. As especially shown in FIGS. 3 and 4, the insert 40 has six interior lands 46 of individually rectangular cross section.

The materials from which the base 20 and the insert sleeve 40 are fabricated and the manner of assembly will be described hereinbelow.

The adjustable impedance component proper, here the threaded core 50, is of conventional design, made from non-magnetic material such as brass, or from magnetic material such as powdered iron. The outside diameter of the core thread is somewhat greater than the distance between the opposite surfaces of two opposite lands, such as 46, 47 indicated in FIG. 3. The core 50 is slotted, in this embodiment preferably on each side as indicated in FIG. 2 at 53, 54 for receiving an adjusting tool such as a screwdriver. The stationary impedance element will here be a coil wound around the tubular portion between flanges 22 and 23.

Figure 5:
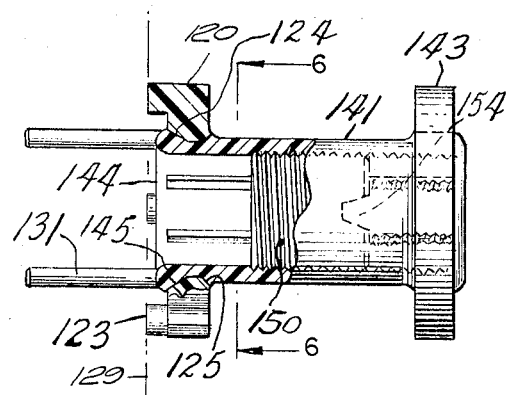
FIG. 5 is a side view, partly in section on lines 5—5 of FIG. 4.

The second embodiment of the invention, illustrated in FIGS. 4, 5, 6 and 7 is typical of a so-called vertical coil form for mounting normally to a surface. In this embodiment the supporting base member is a plate 120 of approximately square shape with cut-away corners and with a circular window 121. Notches 122 are provided for wires leading from the stationary impedance element, here a coil, and distancing projections 123 are provided for raising the base above the supporting surface 129, establishing a moisture platform. Several, here four, pins 131 are molded into the base plate 120. Similarly to the above described pins 31 of the horizontal coil form, the pins are provided with antirotation and antipulling anchors and knurls. Similarly to the spline cutouts or recesses 24, 25, described above with reference to the flanges 22 and 23 of the support 20 of FIGS. 1, 2 and 3, the plate 120 has chamfered cutouts 124, here four, as shown in FIGS. 5 and 7. The sleeve insert 140 is in this instance self-supporting and has only one flange namely 143, a tubular central or coil form portion 141, and at the other end a lip portion 144 corresponding to lip portion 41 of FIG. 2. The flange 143 corresponds to flange 23 of FIGS. 1 to 3. The sleeve 140 is with bulges 145 molded into the spline recesses 124 of the plate 120 in the manner described above with reference to the sleeve 40 of FIGS. 1 to 3. As indicated at 125 of FIGS. 5 and 7, a chamfer extends into the plate 120, preventing together with the bulges 145 axial separation of plate 120 and sleeve 140. As especially shown in FIG. 6, the sleeve 140 has interior lands 146, 147 similar to lands 46, 47 of FIG. 3. The adjustable core 150 is similar to that described above with reference to FIGS. 1 to 3, but in this instance requires only one screwdriver slot 154. A coil is wound on tubular insert portion 141, between flange 143 and plate 120 constituting a second flange.

A third embodiment of the invention is illustrated in FIGS. 8 to 10. This embodiment is a horizontal coil form similar to that illustrated in FIGS. 1 to 3, but in this embodiment the base constitutes the coil form and projects therebeyond to provide, with its insert, a withdrawal portion for the core. The support 220 has a thin tubular portion 221 with a flange 222, and a thick tubular portion 223 corresponding somewhat to flange 23 of FIG. 2. The thin tubular portion 221 serves as coil form proper whereas the thick portion 223 serves as a support for the adjustable core 250 similar to cores 50 and 150, permitting complete withdrawal of the core from the coil form part 221. Pins 231 are inserted in the flange portion 222 and in the thickened withdrawal portions 223 of the base, as clearly indicated in FIGS. 8 to 10. The insert or sleeve portion 240 is securely anchored in the thick portion 223 against axial as well as rotary movement by means of projections 245, 246 which fill recesses 225, 226 in the thick portion 223. The sleeve portion has again lands 236 of the same nature as described above with reference to FIGS. 2 to 6. The flange 222 and the withdrawal portion 223 have flat projections 227, 228 for resting on a board 229.

It will now be understood that the principle of the invention is incorporated in all embodiments described, although the base and insert components, respectively, do not in each case have identical functions. Thus, while the insert or sleeve component always provides the adjustment preserving frictional torque and the base component serves for mounting the device, the insert may serve as coil form as in FIGS. 4 to 7 or the base may have that function as in FIGS. 1 to 3 and 8 to 10.

The fabrication of devices of the above described type will now be described with reference to FIG. 11.

The base or support portion such as 20 of FIGS. 1 to 3, 120 of FIGS. 4 to 7 and 220 of FIGS. 8 to 10 is first (step I of FIG. 11) molded around the pins 31, 131, 231 by conventional methods. An intermediate assembly exemplified by FIG. 7 results. The moldable synthetic material used for this component is selected with a view to having exceptional inertness to high heat and heat fluctuations as well as excellent electrical properties, and dimensional stability under extremely adverse environmental conditions. Thermosetting allyl resins such as prepolymers of diallyl phthalate and diallyl isophthalate, sometimes referred to as DAP, filled with glass fiber, have been found especially suitable, but it is understood that materials of analogous properties can be used. Heat-resistant thermosetting resins are particularly suitable for purposes of the invention because they provide a firm foundation for mounting, withstand the heat of dip-soldering without loosening of pins therein, and are not affected by the molding thereinto of thermoplastic components.

The insert, sleeve or liner component 40 of FIGS. 1 to 3, 140 of FIGS. 4 to 7 and 240 of FIGS. 8 to 10 is then (step II of FIG. 11) molded into the base or supporting components (for example shown by FIG. 7) such that the above-described recess, bevels, and cut away portions of the base will be filled by projections from the insert. This spline and bevel construction securely prevents axial as well as rotatory separation of the two components. The insert, sleeve or liner is molded from a thermoplastic material which is especially suitable for present purposes because of immunity to stress-cracking and flex fatigue, uniform shrinkage, superior resiliency, and very high tensile as well as tear strength. Such a material is for example polypropylene, but it is understood that materials with similar properties can be used.

The material selected for the insert component 40 or 140 or 240, such as polypropylene, has sufficient resiliency to permit relative adjustment of cores 50, 150 or 250 therein, while it also provides a high frictional torque that resists displacement by shock or vibration. The threads of the core penetrate into the smooth lands of the liner and if once fully inserted provide very exact and permanent axial adjustment. Nevertheless the core thread does not actually cut into the land material which slowly moves back into the original flat surface configuration, being actually freshly impressed every time the core is rotated for axial adjustment. This is indicated in the drawings where it is assumed that for example in FIG. 2 the core has been inserted a short time ago from the left side, whereas in FIG. 5 it has been adjusted some time ago.

It will now be understood that this relation of the rigid core thread and the resilient lands provides in a very simple manner precise adjustment, and moreover the application of a frictional torque which is under all conditions sufficient to prevent movement either by vibration or externally applied forces up to considerable, ordinarily not encountered, values corresponding to purposely applied adjustment torques. Also, exact initial dimensioning of the lands and exact threading of the core provide a permanently uniform air gap between core and the impedance element on the sleeve, either a coil or a capacitor electrode. It will now be evident that these favorable results are attained, in accordance with the invention, by the characteristic resolution of the mount into components made from purposely selected materials in correspondingly conceived shapes.

It should be understood that the present disclosure is for the purpose of illustration only and that this invention includes all modifications and equivalents which fall within the scope of the appended claims.

I claim:
1. A mount for a variable inpedance device comprising:
   a base of highly heat resistive and dimensionally stable resin having an opening and longitudinal and transverse locking faces; and
   an insert of a dimensionally stable resin of high resiliency and tear strength, having projections molded into said opening to contact said locking faces and having a tubular portion with interior essentially smooth lands.
2. Mount according to claim 1 wherein said base is molded of a thermosetting resin and said insert is made of a thermoplastic resin.
3. Mount according to claim 2 wherein said thermosetting resin is a diallyl phthalate polymer and said thermoplastic resin is a propylene polymer.
4. Mount according to claim 1 wherein said base has pin-shaped metallic mounting means molded thereinto.
5. Mount according to claim 1 wherein said base is tubular with a flange at each end having metallic mounting pins molded thereinto in transverse direction, and wherein said insert extends within the entire length of the base to which it is molded.
6. Mount according to claim 1 wherein said base is plate-shaped with metallic mounting pins molded thereinto in longitudinal direction, and wherein said insert is tubular with one end molded into the opening of said plate.
7. Mount according to claim 1 wherein said base is tubular with a thin-walled portion and a thick-walled portion, and wherein said insert extends only within said thick-walled portion into which it is molded.

8. A variable impedance device comprising:
   a mount with base and insert according to claim 1, combined with
   a metallic core with an outside thread having a diameter greater than the diametrical distance of said lands.
9. A mount for a variable impedance device comprising:
   a tubular base of highly heat resistive and dimensionally stable thermosetting resin having at each end a flange with longitudinal and transverse locking faces, and metallic mounting pins molded thereinto, and
   a tubular insert of a resilient thermoplastic resin with high tear strength and immune to stress-cracking extending within the length of said tubular base with locking faces molded into said locking faces of the base, and having longitudinal, smooth, interior lands.
10. A mount for a variable impedance device comprising:
    a plate shaped support of highly heat resistive and dimensionally stable thermosetting resin having a round opening with longitudinal and transverse locking faces on its inner edge, and metallic mounting pins molded thereinto, and
    a tubular sleeve of a resilient thermoplastic resin with high tear strength and immune to stress-cracking, extending at one end into said opening with locking faces molded into said faces of the support, and having longitudinal, smooth, interior lands.
11. A mount for a variable impedance device comprising:
    a tubular base of highly heat resistive and dimensionally stable thermosetting resin having a thin walled portion with a flange at one end, a thick walled tubular portion at the other end having transverse internal recesses, and metallic mounting means molded thereinto, and
    a tubular insert of a resilient thermoplastic resin with high tear strength and immune to stress-cracking extending within the length of said thick walled tubular portion and molded with projections extending into said recesses of the base, and having longitudinal, smooth interior lands.

References Cited by the Examiner
FOREIGN PATENTS 1,351,583    12/1963    France.

LEWIS H. MYERS, *Primary Examiner.*

ROBERT K. SCHAEFER, LARAMIE E. ASKIN,
*Examiners.*

C. A. TORRES, *Assistant Examiner.*